(12) United States Patent
Harada et al.

(10) Patent No.: US 10,997,406 B2
(45) Date of Patent: May 4, 2021

(54) IMAGE PROCESSING APPARATUS FOR DETERMINING PROPER READING ORDER OF DOCUMENTS

(71) Applicant: SEIKO EPSON CORPORATION, Tokyo (JP)

(72) Inventors: Eiichi Harada, Matsumoto (JP); Kiyoshi Mizukura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/752,047

(22) Filed: Jan. 24, 2020

(65) Prior Publication Data
US 2020/0242347 A1 Jul. 30, 2020

(30) Foreign Application Priority Data
Jan. 25, 2019 (JP) .............................. JP2019-010934

(51) Int. Cl.
*G06K 15/00* (2006.01)
*G06K 9/00* (2006.01)
*G06K 9/20* (2006.01)
*H04N 1/00* (2006.01)

(52) U.S. Cl.
CPC ..... *G06K 9/00456* (2013.01); *G06K 9/00469* (2013.01); *G06K 9/2054* (2013.01); *H04N 1/00806* (2013.01); *H04N 1/00816* (2013.01); *G06K 2209/01* (2013.01)

(58) Field of Classification Search
None
See application file for complete search history.

(56) References Cited

U.S. PATENT DOCUMENTS

| 5,907,631 | A * | 5/1999 | Saitoh | G06K 9/00442 382/176 |
| 6,038,342 | A * | 3/2000 | Bernzott | G06K 9/00463 382/173 |
| 7,929,186 | B2 * | 4/2011 | Kubota | H04N 1/00822 358/474 |
| 9,785,849 | B2 * | 10/2017 | Cimpoi | G06K 9/18 |
| 2006/0190489 | A1 * | 8/2006 | Vohariwatt | G06Q 10/00 |
| 2008/0018950 | A1 * | 1/2008 | Kobayashi | H04N 1/387 358/450 |
| 2012/0008864 | A1 * | 1/2012 | Kanatsu | G06K 9/00449 382/176 |
| 2012/0105918 | A1 * | 5/2012 | Fan | G06K 9/3208 358/462 |

(Continued)

FOREIGN PATENT DOCUMENTS

JP 2007-036732 2/2007

*Primary Examiner* — Dung D Tran
(74) *Attorney, Agent, or Firm* — Workman Nydegger

(57) ABSTRACT

An image processing apparatus includes a controller configured to execute a process on a result of reading on a plurality of documents. The controller obtains document data of a plurality of pages generated by reading the plurality of pages, executes detection of a heading region corresponding to a headline of a document on the obtained document data of the individual pages, and makes a determination as to whether reading order of the documents is appropriate by estimating the anteroposterior relationship among the pages based on presence or absence of the heading region in the document data of the individual pages.

5 Claims, 6 Drawing Sheets

(56) References Cited

U.S. PATENT DOCUMENTS

2013/0215475 A1\* 8/2013 Noguchi ............ H04N 1/32133
                                                          358/448
2014/0072224 A1\* 3/2014 Cimpoi .................... G06K 9/18
                                                          382/182

\* cited by examiner

FIG. 4

| TYPE (FEATURE) OF PRECEDING PAGE | TYPE OF SUCCEEDING PAGE |
|---|---|
| TYPE a (HEADING REGION, LOWER BLANK REGION) | TYPE a OR b |
| TYPE b (HEADING REGION, NO LOWER BLANK REGION) | TYPE c OR d |
| TYPE c (NO HEADING REGION, LOWER BLANK REGION) | TYPE a OR b |
| TYPE d (NO HEADING REGION, NO LOWER BLANK REGION) | TYPE c OR d |

IMAGE PROCESSING APPARATUS FOR DETERMINING PROPER READING ORDER OF DOCUMENTS

The present application is based on, and claims priority from JP Application Serial Number 2019-010934, filed Jan. 25, 2019, the disclosure of which is hereby incorporated by reference herein in its entirety.

BACKGROUND

1. Technical Field

The present disclosure relates to an image processing apparatus and a non-transitory recording medium which stores an image processing program.

2. Related Art

Sheet feed scanners capable of reading both sides of a document may consecutively perform both-side reading on a plurality of documents. If a user mistakenly sets a bundle of a plurality of documents to a sheet feed scanner in an upside-down manner, reading is started from a back surface of a last sheet of the bundle of documents.

Note that an image reading apparatus which transmits a notification indicating that a back surface and a front surface of a document has been mistakenly set in an upside-down manner when the front surface of the document is determined as a blank sheet and the back surface is not determined as a blank sheet has been used (refer to JP-A-2007-36732).

However, when a method for determining a blank sheet as a back surface of a document according to JP-A-2007-36732 is employed, when the back surface of the document has also been printed, the front surface and the back surface of the document may not be distinguished from each other. Therefore, it is difficult to determine whether documents have been read in appropriate order using read data of a plurality of pages, all of which include text.

SUMMARY

According to an aspect of the present disclosure, an image processing apparatus includes a controller configured to execute a process on a result of reading on a plurality of documents. The controller obtains document data of a plurality of pages generated by reading the plurality of pages, executes detection of a heading region corresponding to a headline of a document on the obtained document data of the individual pages, and makes a determination as to whether reading order of the documents is appropriate by estimating the anteroposterior relationship among the pages based on presence or absence of the heading region in the document data of the individual pages.

BRIEF DESCRIPTION OF THE DRAWINGS

FIG. 4 is a diagram illustrating an example of an estimation rule.

DESCRIPTION OF EXEMPLARY EMBODIMENTS

Hereinafter, an embodiment of the present disclosure will be described with reference to the accompanying drawings. The drawings are merely examples for illustrating this embodiment. Since the drawings are merely examples, the drawings may not have consistency or portions may be omitted.

1. OUTLINE OF SYSTEM

Figure 1:
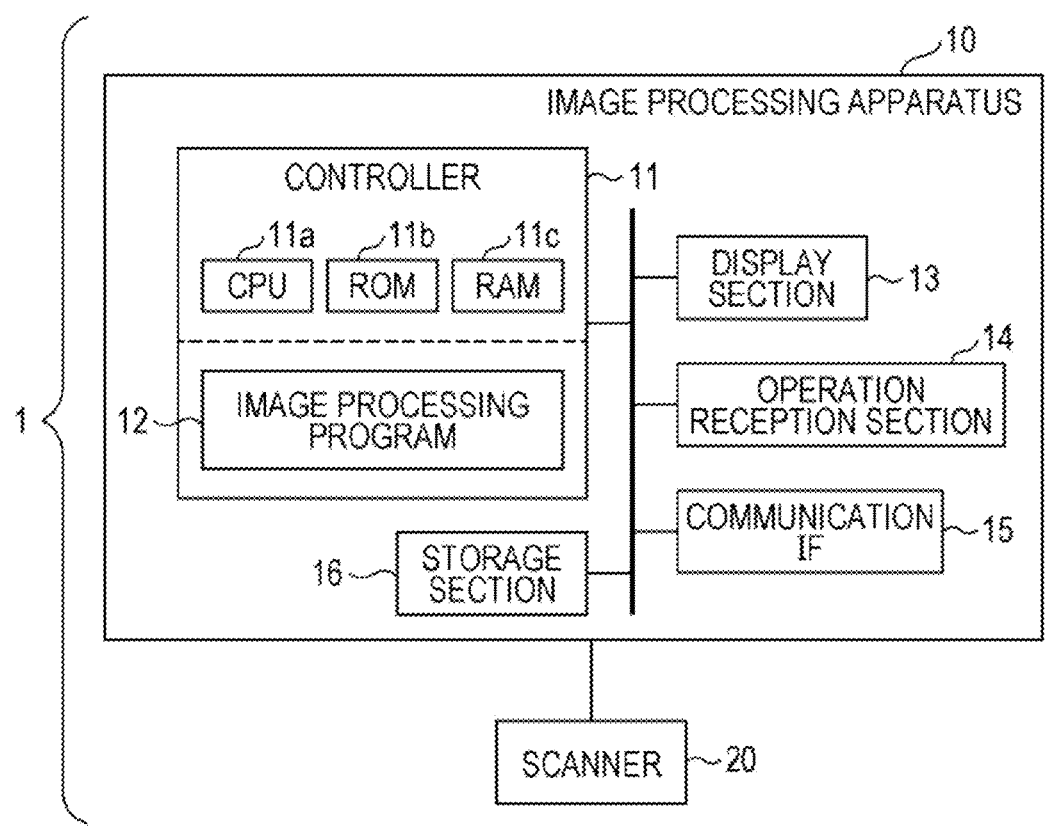
FIG. 1 is a block diagram schematically illustrating a configuration of a system.

FIG. 1 is a diagram schematically illustrating a configuration of a system 1 according to this embodiment. The system 1 includes an image processing apparatus 10 and a scanner 20. The system 1 may be referred to as an image reading system. The scanner 20 may be referred to as an image reading apparatus.

The image processing apparatus 10 is realized by a personal computer, a smartphone, a tablet terminal, a cellular phone, a server, or an information processing apparatus having a processing capability equal to those of them. The image processing apparatus 10 includes a controller 11, a display section 13, an operation reception section 14, a communication interface 15, and a storage section 16. The interface is denoted by an abbreviation "IF". The controller 11 includes at least one integrated circuit (IC) including a central processing unit (CPU) $11a$ serving as a processor, a read only memory (ROM) $11b$, and a random access memory (RAM) $11c$, and other nonvolatile memories.

In the controller 11, the processor, that is, the CPU $11a$ controls the image processing apparatus 10 by executing a calculation process in accordance with a program stored in the ROM $11b$, the other memories, or the like using the RAM $11c$ or the like as a work area. The controller 11 executes a process in accordance with an image processing program 12, for example. Note that the processor is not limited to a single CPU but may be a plurality of CPUs which perform processes using a hardware circuit, such as an application specific integrated circuit (ASIC), or may be a CPU and a hardware circuit which perform processing in cooperation with each other.

The display section 13 is a unit which displays visual information and is constituted by a liquid crystal display or an organic electroluminescence (EL) display, for example. The display section 13 may include a display and a driving circuit which drives the display. The operation reception section 14 is a unit which receives operations performed by a user and realized by physical buttons, a touch panel, a mouse, a keyboard, or the like. The touch panel may be realized as a function of the display section 13. The display section 13 and the operation reception section 14 may be collectively referred to as an operation panel of the image processing apparatus 10.

The display section 13 and the operation reception section 14 may be portions of the image processing apparatus 10 or peripherals externally attached to the image processing apparatus 10. The communication IF 15 is a collective term of a single or a plurality of IFs used when the image processing apparatus 10 performs external communication in a wired manner or a wireless manner based on a predetermined communication protocol including a general communication standard. The storage section 16 includes a hard disk drive and a nonvolatile memory, for example. The storage section 16 may be a portion of the controller 11.

The scanner 20 is a sheet feed scanner capable of consecutively reading a plurality of documents. The scanner 20 optically reads a document using an image sensor and generates and outputs image data as a result of the reading as it is widely used. The image processing apparatus 10 is coupled to the scanner 20 through the communication IF 15. The image processing apparatus 10 receives the image data output from the scanner 20 and executes a process on the received image data.

Figure 2:
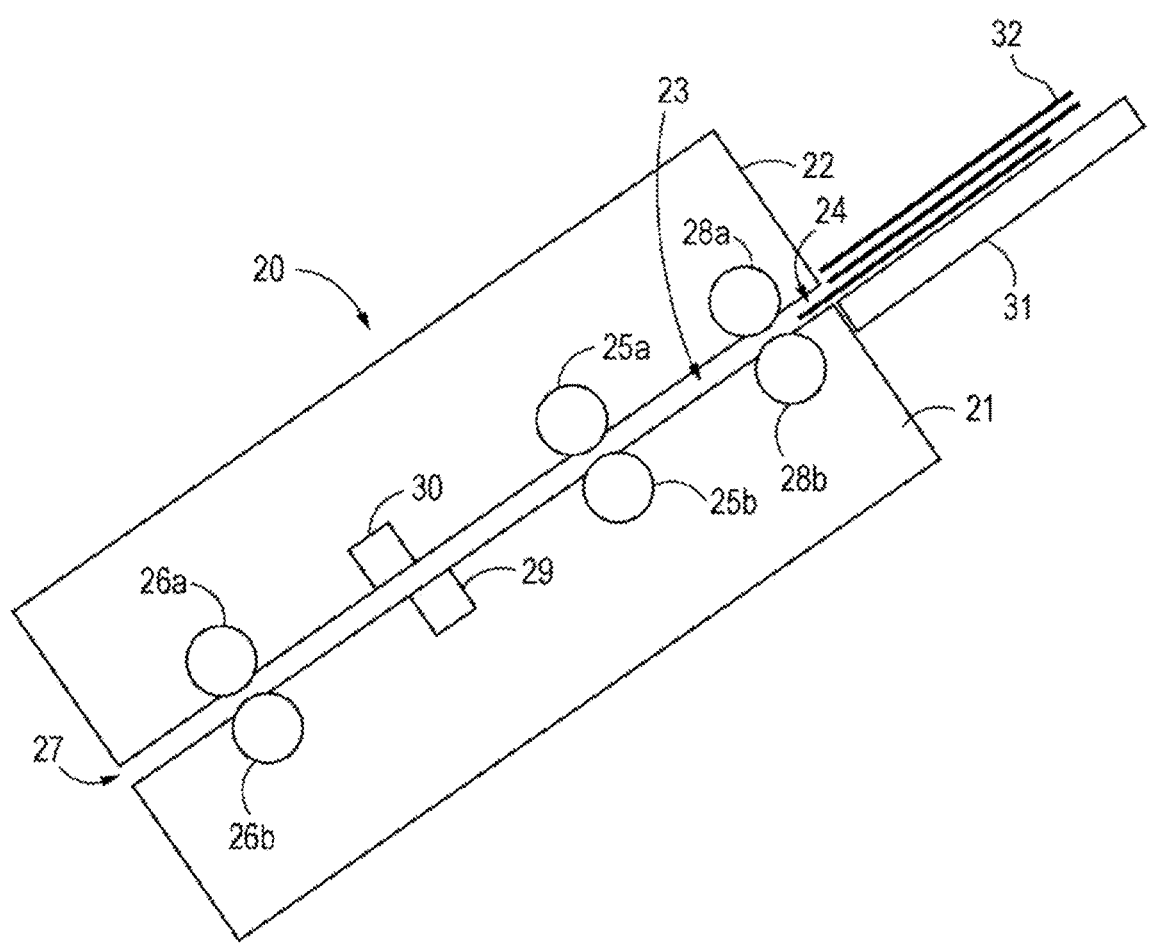
FIG. 2 is a diagram schematically illustrating a mechanical structure of a scanner including a transport path.

FIG. 2 is a diagram schematically illustrating a mechanical structure of the scanner 20 including a transport path 23. The scanner 20 includes a body portion 21 and a cover 22 which covers a certain surface of the body portion 21. The cover 22 is openable and closable relative to the body portion 21. The transport path 23 for documents 32 is ensured in a portion between the body portion 21 and the cover 22. The scanner 20 obtains the documents 32 one by one from a supply port 24 on an upstream side of the transport path 23. Then the scanner 20 transports the documents 32 obtained through the supply port 24 into the transport path 23 by rotating rollers 25a, 25b, 26a, 26b, 28a, and 28b and externally outputs the documents 32 from a discharge port 27 on a downstream side of the transport path 23.

The rollers 25a, 25b, 26a, 26b, 28a, and 28b are included in a transport section of the scanner 20 which transports the documents 32. Although not illustrated, the transport section includes motors which rotate the respective rollers and the like. The rollers 25a and 25b which face each other are disposed as a pair with the transport path 23 interposed therebetween. Similarly, the rollers 26a and 26b which face each other are disposed as a pair with the transport path 23 interposed therebetween, and the rollers 28a and 28b which face each other are disposed as a pair with the transport path 23 interposed therebetween. The roller 25a is disposed on the cover 22, and the roller 25b is disposed on the body portion 21. The roller 26a is disposed on the cover 22, and the roller 26b is disposed on the body portion 21. The roller 28a is disposed on the cover 22, and the roller 28b is disposed on the body portion 21. The rollers 25a and 25b are disposed on an upstream side of transport relative to reading sections 29 and 30 disposed in certain portions of the transport path 23. The rollers 26a and 26b are disposed on a downstream side relative to the reading sections 29 and 30. The rollers 28a and 28b are disposed in the vicinity of the supply port 24 on an upstream side relative to the rollers 25a and 25b.

A sheet feeding tray 31 on which the documents 32 may be stacked is disposed in the vicinity of the supply port 24. The documents 32 are media of a sheet shape which have been subjected to printing, and are typically paper. The transport section includes a so-called auto document feeder (ADF) which consecutively obtains the documents 32 one by one starting from a lowermost portion of the bundle of documents 32 mounted on the sheet feeding tray 31 to the transport path 23. The rollers 28a and 28b may be the ADF.

The reading section 29 disposed on the body portion 21 is referred to as a first reading section 29 and the reading section 30 disposed on the cover 22 is referred to as a second reading section 30. Each of the first and second reading sections 29 and 30 includes an image sensor, a light source, and various optical systems. In each of the first and second reading sections 29 and 30, the image sensor receives reflection light which has been emitted from the light source and reflected by the document 32 and outputs charge generated in accordance with a light reception amount as image data. The image sensor includes a plurality of photoelectric conversion elements arranged in a main scanning direction. The main scanning direction intersects with a transport direction of the documents 32. Although the intersection means an orthogonal intersection in this embodiment, the intersection may also include, in addition to the orthogonal intersection, an error caused depending on a degree of accuracy of actual assemble of the components. In FIG. 2, the main scanning direction is vertical to surfaces of the sheets.

The scanner 20 may read both sides of the document 32. Specifically, the first reading section 29 reads one surface of the document 32 transported in the transport path 23 which faces the body portion 21, and the second reading section 30 reads the other surface of the document 32 transported in the transport path 23 which faces the cover 22.

In this embodiment, one of the both surfaces of the document 32 which faces the body portion 21, that is, the surface read by the first reading section 29, is referred to as a "first surface". The other of the both surfaces of the document 32 which faces the cover 22, that is, the surface read by the second reading section 30, is referred to as a "second surface".

Alternatively, the scanner 20 may include only the first reading section 29 among the first and second reading sections 29 and 30 and have a mechanism of reversing the document 32 after reading one of the surfaces of the document 32. In this case, the surface which first faces the body portion 21, that is, the surface which is first read by the first reading section 29, is the "first surface", and the surface which is read by the first reading section 29 after the reversing is the "second surface".

Ideally, a "front surface" of the document 32 corresponds to the "first surface", and a "back surface" of the document 32 corresponds to the "second surface". The front surface and the back surface of the document 32 are determined in advance based on content of the document 32. The user sets the document 32 on the sheet feeding tray 31 such that the front surface of the document 32 faces downward, that is, the front surface faces the body portion 21. However, the user may mistakenly set the document 32 on the sheet feeding tray 31 in a state in which the back surface faces the body portion 21. The scanner 20 outputs image data for two pages for one document 32, that is, image data which is a result of the reading performed by the first reading section 29 on the first surface of the document 32 and image data which is a result of the reading performed by the second reading section 30 or the first reading section 29 on the second surface of the document 32 in this order to the image processing apparatus 10.

The image processing apparatus 10 and the scanner 20 may be coupled to each other through a network, not illustrated. The image processing apparatus 10 may be realized by a single independent information processing apparatus or a plurality of information processing apparatuses coupled to one another in a communication available manner through a network. Alternatively, the image processing apparatus 10 and the scanner 20 may be integrated as one apparatus. Specifically, a process executed by the image processing apparatus 10 described below may be recognized as a process executed by the image processing apparatus 10 which is a portion of the scanner 20.

2. PROCESS OF DETERMINING WHETHER READING ORDER IS APPROPRIATE

Figure 3:
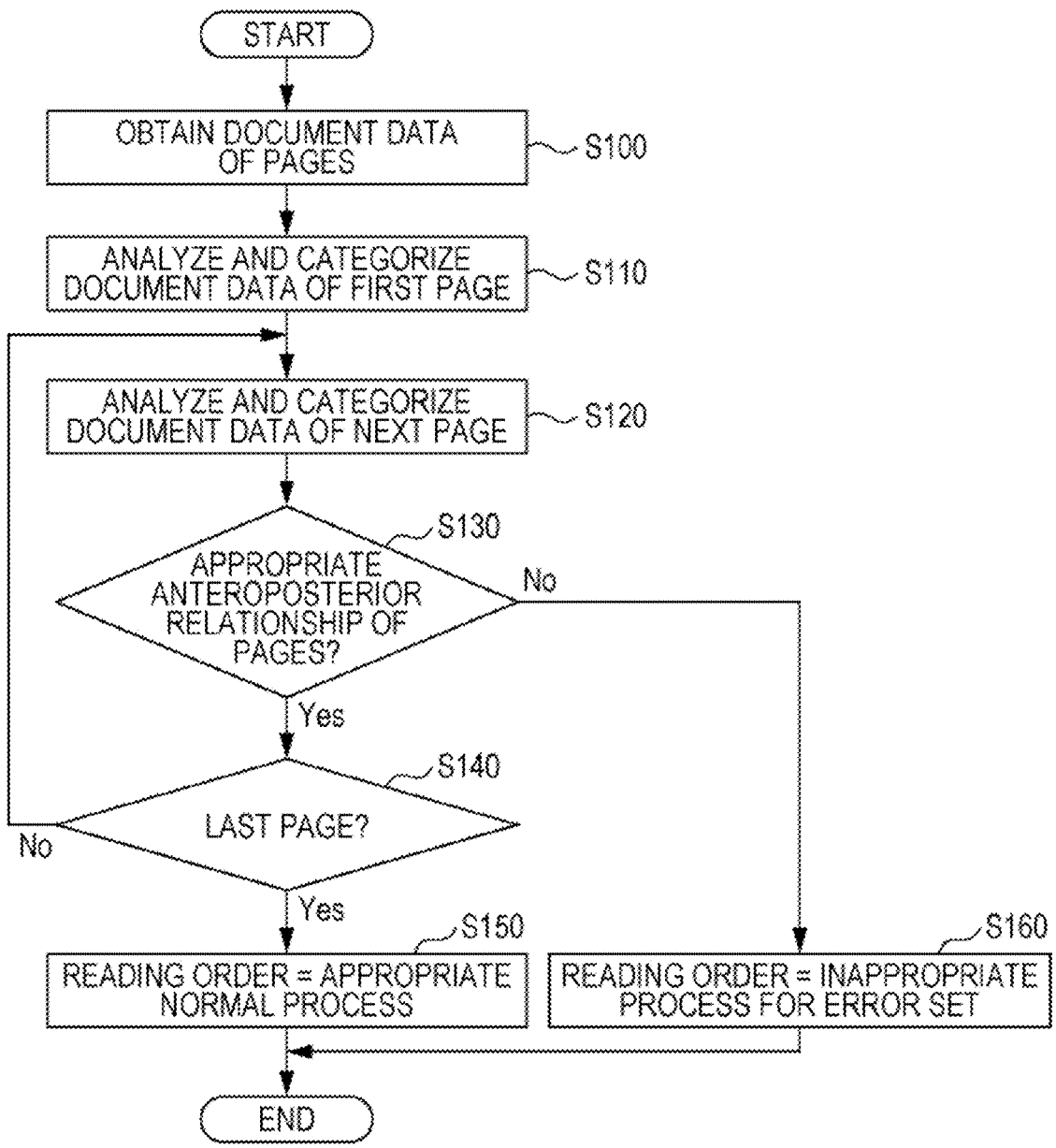
FIG. 3 is a flowchart of a process of determining whether reading order is appropriate.

FIG. 3 is a flowchart of a process of determining whether reading order is appropriate which is performed by the controller 11 in accordance with the image processing program 12.

In step S100, the controller 11 obtains image data of a plurality of pages output by both-side reading performed by the scanner 20 on the plurality of documents 32 as described above through the communication IF 15. It is assumed, in this embodiment, that the scanner 20 reads the documents 32 which have been subjected to the both-side printing. Hereinafter, image data generated by the scanner 20 reading the documents 32 and output to the image processing apparatus 10 is referred to as "document data".

Document data of a plurality of pages are output from the scanner 20 in order of document data obtained as a result of reading on the first surface of the document 32 of a first page, document data obtained as a result of reading on the second surface of the document 32 of the first page, document data obtained as a result of reading on a first surface of the document 32 of a second page, document data obtained as a result of reading on a second surface of the document 32 of the second page, and so on. Therefore, in step S100, the controller 11 consecutively obtains the document data of the plurality of pages generated by the reading on the first surfaces of the plurality of documents 32 as document data of a plurality of pages having odd numbers (odd-numbered pages) and document data of the plurality of pages generated by the reading on the second surfaces of the plurality of documents 32 as document data of a plurality of pages having even numbers (even-numbered pages).

In step S110, the controller 11 analyzes the document data of the first page in the document data of the plurality of pages obtained in step S100 so as to categorize the document data of the first page into one of various page types.

In this case, the controller 11 detects a "heading region" by analyzing the document data of the first page. The heading region includes a character string corresponding to a title of the document. The heading may also be referred to as a caption, a title, a headline, or the like.

The controller 11 extracts a character string from document data of the page which is a target for detecting a heading region by character recognition. Then the controller 11 detects a character string which has a comparatively large font size and which ensures line spaces with other character strings larger than line spaces among the other character strings or equal to or larger than a predetermined value as the heading region. For example, the controller 11 may categorize extracted character strings according to font sizes and determine whether a character string of a largest font size among the categorized character strings is appropriate for the heading region taking the condition of line spaces described above into consideration. Note that the controller 11 may detect the heading region based on the condition of a font size or the condition of line spaces described above.

Furthermore, the controller 11 detects a "lower blank region" by analyzing the document data of the first page. The lower blank region is a blank region in a lower portion in a page. The blank region means a region in which objects, such as characters, graphics, and photo images, are not printed. The controller 11 specifies white regions in an upper, lower, right, and left regions of the page corresponding to the document data in which the lower blank region is to be detected. On each of the surfaces of the document 32, white regions referred to as white spaces, edges, margins, or the like in which printing is not performed are generally ensured in upper, lower, right, and left end portions. Therefore, the controller 11 specifies regions having predetermined widths in the upper, lower, right, and left ends of the document data for each page as white regions. Then the controller 11 detects a blank region which is included in a region other than the white regions of the document data of the page of a target of the detection of a lower blank region and which includes a lowermost row as the lower blank region. If a character string is included in the lowermost row, the lower blank region does not exist, that is, the lower blank region is not detected.

The controller 11 categorizes the document data of the first page according to a result of the detection of the heading region and a result of the detection of the lower blank region.

The controller 11 categorizes the document data of the page which includes the heading region which has been successfully detected and the lower blank region which has been successfully detected as a first type (hereinafter referred to as a "type a").

The controller 11 categorizes the document data of the page which includes the heading region which has been successfully detected and which does not include the lower blank region as a second type (hereinafter referred to as a "type b").

The controller 11 categorizes the document data of the page which does not include the heading region and which includes the lower blank region which has been successfully detected as a third type (hereinafter referred to as a "type c").

The controller 11 categorizes the document data of the page which does not include the heading region and which does not include the lower blank region as a fourth type (hereinafter referred to as a "type d").

In step S120, the controller 11 categorizes a next page of the page which has been categorized in step S110 or which has been categorized in a preceding process in step S120 at a current time point among the document data of the plurality of pages obtained in step S100 according to a page type by analyzing the document data. The process in step S110 and the process in step S120 are performed on different target pages but the processes are the same. Specifically, also in step S120, the controller 11 executes the detection of a heading region and the detection of a lower blank region on the document data of a target page and categorizes the target page into the type a, b, c, or d according to a result of the detection of a heading region and a result of the detection of a lower blank region. In step S120 executed after step S110, the controller 11 similarly performs the categorization on document data of a second page in the document data of the plurality of pages obtained in step S100.

In step S130, the controller 11 estimates the anteroposterior relationship of the document data of the consecutive two pages and determines whether the anteroposterior relationship is appropriate. Here, the document data of the consecutive two pages means the document data of the page categorized in step S120 (hereinafter referred to as a "succeeding page") and the document data of the page immediately before the second page (hereinafter referred to as a "preceding page"). In the process in step S130 executed after the flow from step S110 to step S120, the first page in the plurality of pages corresponding to the document data obtained in step S100 corresponds to the preceding page and the second page corresponds to the succeeding page.

The controller 11 estimates the anteroposterior relationship of the document data of the consecutive two pages with reference to an estimation rule 40.

FIG. 4 is a diagram illustrating an example of the estimation rule 40. The estimation rule 40 is a type of table and stored in a predetermined storage region (the storage section 16, for example) in advance. The estimation rule 40 defines the correspondence relationship between a page type of the preceding page and a page type of the succeeding page.

It is estimated that, according to the estimation rule 40, when the page type of the preceding page is the type a, the page type of the succeeding page is the type a or the type b. The estimation is made since it is highly likely that a next page of a page having a heading region and a lower blank region has a heading region.

Furthermore, it is estimated that, according to the estimation rule 40, when the page type of the preceding page is the type b, the page type of the succeeding page is the type c or the type d. The estimation is made since it is highly likely that a next page of a page which includes a heading region and which does not include a lower blank region does not have a heading region.

Furthermore, it is estimated that, according to the estimation rule 40, when the page type of the preceding page is the type c, the page type of the succeeding page is the type a or the type b. The estimation is made since it is highly likely that a next page of a page which does not have a heading region and which has a lower blank region has a heading region.

Furthermore, it is estimated that, according to the estimation rule 40, when the page type of the preceding page is the type d, the page type of the succeeding page is the type c or the type d. The estimation is made since it is highly likely that a next page of a page which does not include a heading region and which does not include a lower blank region does not have a heading region.

The controller 11 estimates a page type of the succeeding page based on the page type of the preceding page and the estimation rule 40. Thereafter, when one of the estimated page types of the succeeding page matches the page type of the succeeding page categorized in step S120, the controller 11 determines that the anteroposterior relationship of the document data of the consecutive two pages is appropriate ("Yes" in step S130) and proceeds to step S140. On the other hand, when any of the estimated page types of the succeeding page does not match the page type of the succeeding page categorized in step S120, the controller 11 determines that the anteroposterior relationship of the document data of the consecutive two pages is inappropriate ("No" in step S130) and proceeds to step S160.

In step S140, the controller 11 branches the process in step S140 by determining whether the determination in step S130 has been terminated while a last one of the plurality of pages corresponding to the document data obtained in step S100 is set as the "succeeding page". Specifically, when determining that the determination in step S130 has been terminated while the last page is set as the succeeding page in step S140 ("Yes" in step S140), the controller 11 proceeds to step S150, and otherwise ("No" in step S140), the process in step S120 onwards is performed again. As is apparent from the description above, in a cycle of repetition of the process in step S120 onwards, a succeeding page in a preceding process in step S130 corresponds to a preceding page in a current process in step S130, and a next page of the succeeding page in the preceding process in step S130 corresponds to a succeeding page in the current process in step S130.

In step S150, the controller 11 determines that reading order of the documents 32 is appropriate. In step S150, the controller 11 further executes a "normal process" and terminates the flowchart. The normal process will be described later.

On the other hand, in step S160, the controller 11 determines that reading order of the documents 32 is inappropriate. In step S160, the controller 11 further executes a "process for an error set" and terminates the flowchart. The process for an error set will be described hereinafter.

Figure 5:
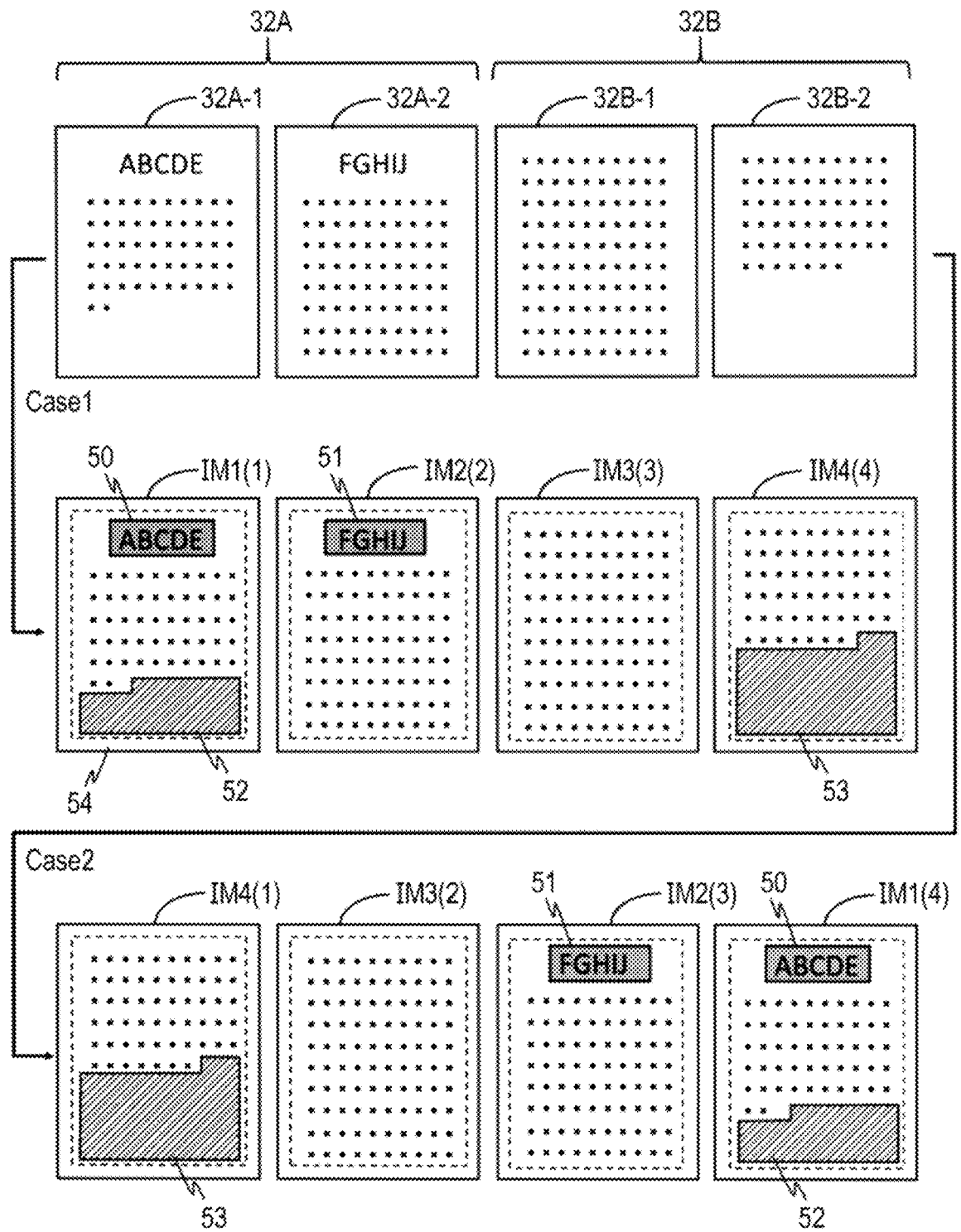
FIG. 5 is a diagram illustrating Case 1 in which a plurality of documents are set and read in a scanner in an appropriate direction and Case 2 in which a plurality of documents are set and read in a scanner in an inappropriate direction.

FIG. 5 is a diagram illustrating Case 1 in which a plurality of documents are set and read in the scanner 20 in an appropriate direction and Case 2 in which a plurality of documents are set and read in the scanner 20 in an inappropriate direction. A certain one of the documents 32 is denoted by a reference numeral 32A, and certain another of the documents 32 which is different from the document 32A is denoted by a reference numeral 32B. Furthermore, a front surface of the document 32A is denoted by a reference numeral 32A-1 and a back surface of the document 32A is denoted by a reference numeral 32A-2. A front surface of the document 32B is denoted by a reference numeral 32B-1 and a back surface of the document 32B is denoted by a reference numeral 32B-2. The documents 32A and 32B are included in the documents 32 having the both surfaces including printed text. As the relationship between the documents 32A and 32B, the document 32A is a leading document 32 and the document 32B is a document after the document 32A.

Therefore, in Case 1, the document 32A is mounted on the sheet feeding tray 31 such that the front surface 32A-1 of the document 32A faces downward, that is, the front surface 32A-1 faces the sheet feeding tray 31, and the document 32B is mounted on the document 32A such that the front surface 32B-1 faces downward. Thereafter, the documents 32A and 32B are read by the scanner 20.

On the other hand, the user may mistakenly set a bundle of the documents 32A and 32B in the scanner 20 such that the back surface 32B-2 of the document 32B faces downward. Specifically, in Case 2, the document 32B is mounted on the sheet feeding tray 31 such that the front surface 32B-2 faces the sheet feeding tray 31 and the document 32A is mounted on the document 32B such that the back surface 32A-2 faces downward. Thereafter, the documents 32B and 32A are read by the scanner 20.

Although the two documents 32A and 32B are illustrated as the plurality of documents 32 to be read by the scanner 20 due to limitations of space in FIG. 5, the scanner 20 may obviously read three or more documents 32 in a consecutive manner.

Document data as a result of reading on the front surface 32A-1 performed by the scanner 20 is denoted by a reference symbol IM1. Document data as a result of reading on the back surface 32A-2 performed by the scanner 20 is denoted by a reference symbol IM2. Document data as a result of reading on the front surface 32B-1 performed by the scanner 20 is denoted by a reference symbol IM3. Document data as a result of reading on the back surface 32B-2 performed by the scanner 20 is denoted by a reference symbol IM4. Each of the document data IM1 to the document data IM4 is image data for each page. In FIG. 5, reference numerals 1 to 4 in parentheses attached to the reference symbols IM1 to IM4, respectively, denote order of the document data of individual pages when the controller 11 of the image processing apparatus 10 obtains the document data from the scanner 20, that is, page order.

In Case 1, the controller 11 obtains the document data IM1 as document data of a first page, the document data IM2 as document data of a second page, the document data IM3 as document data of a third page, and the document data IM4 as document data of a fourth page. On the other hand, in Case 2, the controller 11 obtains the document data IM4 as document data of a first page, the document data IM3 as document data of a second page, the document data IM2 as document data of a third page, and the document data IM1 as document data of a fourth page.

The flowchart of FIG. 3 will be described in detail with reference to Case 1.

In step S110, the controller 11 analyzes the document data IM1 of the first page so as to categorize the document data IM1 of the first page into one of the page types. A character string "ABCDE" in the document data IM1 is an example of a heading. Therefore, in step S110, the controller 11 detects a heading region 50 including the character string "ABCDE". Furthermore, a region 52 indicated by hatching in a lower portion in the document data IM1 is a lower blank region. Specifically, the controller 11 detects the lower blank region 52 in step S110. In FIG. 5, rectangles denoted by dotted lines in the document data IM1 to the document data IM4 define white regions 54. Specifically, regions of a frame shape which are sandwiched between rectangles denoted by solid lines indicating outer edges of the document data IM1 to the document data IM4 and the rectangles denoted by the dotted lines in the document data IM1 to the document data IM4 are the white regions 54. Both the heading region and the lower blank region are detected in regions inside the white regions 54. The controller 11 categorizes the document data IM1 into the type a since the heading region 50 and the lower blank region 52 are successfully detected in the document data IM1.

In step S120 after step S110, the controller 11 analyzes the document data IM2 of the second page so as to categorize the document data IM2 into one of the page types. A character string "FGHIJ" in the document data IM2 is an example of a heading. Therefore, in step S120 after step S110, the controller 11 detects a heading region 51 including the character string "FGHIJ". Furthermore, the document data IM2 is filled with character strings until a lowermost row, and therefore, a lower blank region is not detected. The controller 11 categorizes the document data IM2 into the type b since the heading region 51 is successfully detected but a lower blank region is not detected in the document data IM2.

In step S130 after step S110 and step S120, the controller 11 estimates the anteroposterior relationship between the document data IM1 of the first page and the document data IM2 of the second page and determines whether the anteroposterior relationship is appropriate. A page type of the document data IM1 is the type a, and according to the estimation rule 40, a succeeding page estimated when a preceding page is the type a is the type a or the type b. A page type of the document data IM2 is the type b. Therefore, since the page type of the succeeding page estimated using the page type of the document data IM1 which is the preceding page matches the page type of the document data IM2 which is the succeeding page, the controller 11 makes an affirmative determination in step S130 and proceeds to step S140.

After a negative determination in step S140, in step S120 in a second round, the controller 11 analyzes the document data IM3 of the third page so as to categorize the document data IM3 into one of the page types. The document data IM3 is filled with character strings from an uppermost row to a lowermost row of the page, and therefore, a heading region and a lower blank region are not detected.

Accordingly, the controller 11 categorizes the document data IM3 into the type d. In step S130 after step S120 in the second round, the controller 11 estimates the anteroposterior relationship between the document data IM2 of the second page and the document data IM3 of the third page and determines whether the anteroposterior relationship is appropriate. A page type of the document data IM2 is the type b, and according to the estimation rule 40, a page type of a succeeding page estimated when a preceding page is the type b is the type c or the type d. A page type of the document data IM3 is the type d. Therefore, since the page type of the succeeding page estimated using the page type of the document data IM2 which is the preceding page matches the page type of the document data IM3 which is the succeeding page, the controller 11 makes an affirmative determination in step S130 and proceeds to step S140.

After a negative determination in step S140, in step S120 in a third round, the controller 11 analyzes the document data IM4 of the fourth page so as to categorize the document data IM4 into one of the page types. The document data IM4 includes character strings from an uppermost row of the page and a lower blank region 53 which is a hatched portion in a lower portion of the page. Therefore, the controller 11 categorizes the document data IM4 into the type c since a heading region is not detected and the lower blank region 53 is detected in the document data IM4. In step S130 after step S120 in the third round, the controller 11 estimates the anteroposterior relationship between the document data IM3 of the third page and the document data IM4 of the fourth page and determines whether the anteroposterior relationship is appropriate. A page type of the document data IM3 is the type d, and according to the estimation rule 40, a page type of a succeeding page estimated when a preceding page is the type d is the type c or the type d. A page type of the document data IM4 is the type c. Therefore, since the page type of the succeeding page estimated using the page type of the document data IM3 which is the preceding page matches the page type of the document data IM4 which is the succeeding page, the controller 11 makes an affirmative determination in step S130 and proceeds to step S140. In Case 1, the document data IM4 is the last page, and therefore, the controller 11 makes an affirmative determination in step S140 and proceeds to step S150.

The flowchart of FIG. 3 will be described in detail with reference to Case 2.

In step S110, the controller 11 analyzes the document data IM4 of the first page so as to categorize the document data IM4 into one of the page types. As is apparent from the description above, the document data IM4 is categorized into the type c.

In step S120 after step S110, the controller 11 analyzes the document data IM3 of the second page so as to categorize the document data IM3 into one of the page types. As is apparent from the description above, the document data IM3 is categorized into the type d.

In step S130 after step S110 and step S120, the controller 11 estimates the anteroposterior relationship between the document data IM4 of the first page and the document data IM3 of the second page and determines whether the anteroposterior relationship is appropriate. The page type of the document data IM4 is the type c, and according to the estimation rule 40, a page type of a succeeding page estimated when a preceding page is the type c is the type a or the type b. The page type of the document data IM3 is the type d. Therefore, the page type of the succeeding page estimated using the page type of the document data IM4 which is the preceding page does not match the page type of the document data IM3 which is the succeeding page, and therefore, the controller 11 makes a negative determination in step S130 and proceeds to step S160.

As described above, in step S150, the controller 11 performs the "normal process". In the normal process, for example, document data of a plurality of pages obtained by the scanner 20 is used as a single file of a predetermined format to be stored in a predetermined storage destination (the storage section 16, for example). In step S150, it is determined that reading order of the documents 32 is appropriate since the anteroposterior relationship among the pages corresponding to the document data obtained in step S100 is appropriate based on the estimation rule 40. Therefore, in the normal process, the controller 11 collects the document data of the plurality of pages obtained from the scanner 20 as a single file in order of obtained pages without sorting the pages and stores the collected document data.

In step S160, the controller 11 performs the "process for an error set". In step S160, it is determined that reading order of the documents 32 is inappropriate since the anteroposterior relationship between the pages corresponding to the document data obtained in step S100 is inappropriate according to the estimation rule 40. Therefore, in the process for an error set, the controller 11 transmits a notification indicating that the reading order of the documents 32 is inappropriate to an outside, for example.

Figure 6:
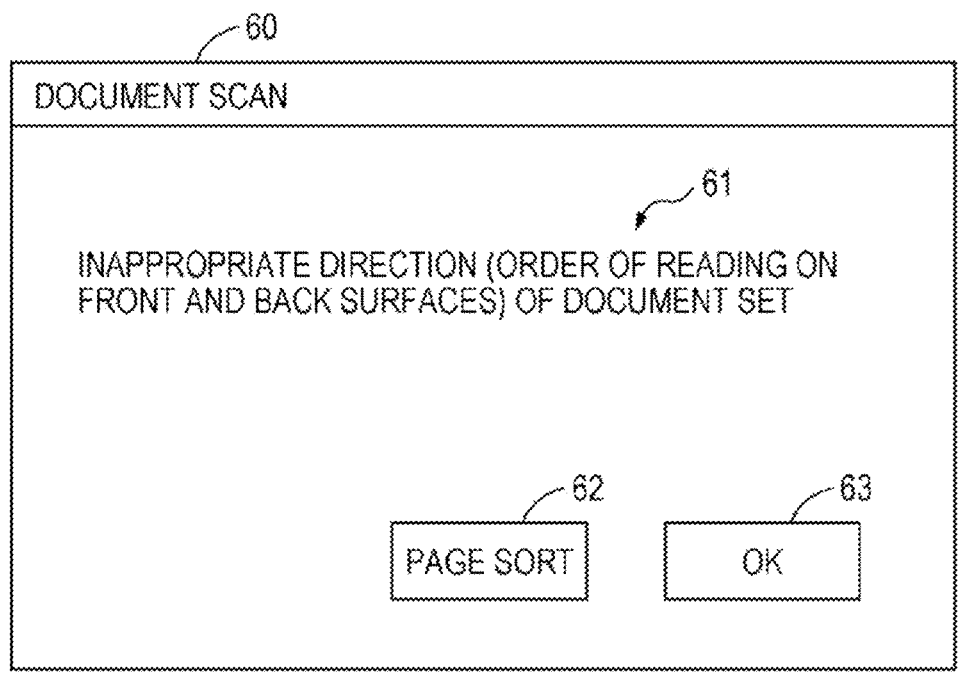
FIG. 6 is a diagram illustrating an example of a UI screen.

FIG. 6 is a diagram illustrating a user interface (UI) screen 60 used by the controller 11 to display the notification in the display section 13 as part of the process for an error set. The UI screen 60 includes a message 61. The message 61 is a character string for causing the user to recognize that the order of reading on the documents 32 performed by the scanner 20 is inappropriate, and content of the character string indicates a message "Inappropriate direction (order of reading on front and back surfaces) of document set", for example. The user who visually recognizes the message 61 presses an OK button 63 included in the UI screen 60 by operating the operation reception section 14 to execute re-scanning on the documents 32. When the re-scanning is performed, the user mounts the plurality of documents 32 on the sheet feeding tray 31 of the scanner 20 in an appropriate direction before causing the scanner 20 to execute the reading on the documents 32.

The UI screen 60 may include a page sort button 62. The user who visually recognizes the message 61 presses the page sort button 62 by operating the operation reception section 14, for example. When detecting the press on the page sort button 62, the controller 11 executes a page sort process as part of the process for an error set. In the page sort process, the document data of the plurality of pages supplied from the scanner 20 are sorted and stored.

According to Case 2 of FIG. 5, the controller 11 has individually obtained the document data IM4 as the document data of the first page, the document data IM3 as the document data of the second page, the document data IM2 as the document data of the third page, and the document data IM1 as the document data of the fourth page. Therefore, in the process of sorting pages executed in step S160 in Case 2, the controller 11 sorts the document data IM4, IM3, IM2, and IM1 in reversed order so as to set the document data IM1 as the document data of the first page, the document data IM2 as the document data of the second page, the document data IM3 as the document data of the third page, and the document data IM4 as the fourth page, and stores the document data IM1 to the document data IM4 in a predetermined storage destination (the storage section 16, for example) as a single file having the predetermined format.

The controller 11 may display the document data of the plurality of pages supplied from the scanner 20 in order of pages supplied from the scanner 20 in the UI screen 60 along with the message 61 or instead of the message 61. Specifically, as illustrated in Case 2 of FIG. 5, the document data IM4 to the document data IM1 are displayed in the UI screen 60 from a left side of the screen. In this way, the user who visually recognizes the document data of the individual pages arranged in order of the back surface 32B-2 of the document 32B, the front surface 32B-1 of the document 32B, the back surface 32A-2 of the document 32A, and the front surface 32A-1 of the document 32A through the UI screen 60 may also concretely recognize that the document set has been set in the scanner 20 in an inappropriate direction, that is, the reading order of the documents 32 is inappropriate.

As described above, the controller 11 executes the page sort process in accordance with an instruction issued by the user through the UI screen 60. However, as another embodiment, the controller 11 may execute the page sort process without displaying the UI screen 60 in step S160. Specifically, the controller 11 may automatically execute the page sort process without receiving an instruction for executing the page sort process issued by the user in step S160.

3. CONCLUSION

As described above, according to this embodiment, the image processing apparatus 10 includes the controller 11 which executes a process on a result of reading on the plurality of documents 32. The controller 11 obtains the document data of the plurality of pages generated by the reading on the plurality of documents 32. Then the controller 11 executes detection of a heading region corresponding to a heading of a document on the obtained document data of the individual pages (step S110 and S120). Then the controller 11 determines whether the order of reading on the documents 32 is appropriate by estimating the anteroposterior relationship among the pages based on presence or absence of the heading region in the document data of the individual pages (step S130, step S150, and step S160).

With this configuration, the controller 11 categorizes the document data of the pages in accordance with the presence or absence of the heading region and estimates the anteroposterior relationship among the pages based on the categories. When the estimated anteroposterior relationship is maintained among the document data in the obtained page order, it is determined that the reading order of the documents is appropriate, and otherwise, it is determined that the reading order of the documents is inappropriate.

In this way, the controller 11 may appropriately determine whether the reading order of the documents 32 is appropriate.

Furthermore, according to this embodiment, the controller 11 executes detection of a blank region in a lower portion in a page (a lower blank region) on the document data of the individual pages (step S110 and S120). Then the controller 11 determines whether the order of reading on the documents 32 is appropriate by estimating the anteroposterior relationship among the pages based on presence or absence of the heading region and presence or absence of the lower blank region in the document data of the individual pages (step S130, step S150, and step S160).

With this configuration, the anteroposterior relationship of the pages may be more accurately estimated based on presence or absence of the two elements, that is, the heading region and the lower blank region. Therefore, a result of the determination as to whether the reading order of the documents 32 is appropriate is also highly reliable.

Note that this embodiment is not limited to the mode in which the heading region and the lower blank region are detected in the document data of the individual pages and includes a mode in which only a heading region is detected. Specifically, the controller 11 executes detection of the heading region in target document data and categorizes a page type of the document data in accordance with presence or absence of the heading region in step S110 and step S120. Furthermore, the estimation rule 40 which is referred to by the controller 11 for the determination in step S130 may be information which defines the anteroposterior relationship among a plurality of page types in accordance with presence or absence of the heading region. Furthermore, it may be assumed that the controller 11 estimates that the document data of the first page is a page type of a page including the heading region. In this case, if the document data of the first page is a page type of a page which does not include the heading region, it may be determined that the anteroposterior relationship between the first page and the second page following the first page does not match the estimation, that is, is inappropriate ("No" in step S130).

Furthermore, the controller 11 may more concretely set page types of document data. For example, the controller 11 categorizes document data into different page types in accordance with a position of a heading region in the document data. Specifically, the controller 11 categorizes the document data into different page types between a case where a character string in an uppermost portion in a page is detected as a heading region and a case where a character string in a portion other than the uppermost portion is detected as a heading region. The controller 11 may categorize document data in which a character string in an uppermost portion is detected as a heading region into the type a or the type b as described above. On the other hand, the controller 11 may categorize document data in which a character string in a portion other than the uppermost portion is detected as a heading region into a fifth type (hereinafter referred to as a type e) which is different from the types a to d. Then the controller 11 may estimate that a page of the type e may be a succeeding page of document data of the type b or the type d, which is a preceding page, which does not include a lower blank region, for example, before making the determination in step S130.

Furthermore, according to this embodiment, the controller 11 detects a heading region based on a font size of a character string or a line space included in document data.

With this configuration, a heading region may be accurately detected in document data.

Furthermore, according to this embodiment, the controller 11 transmits a notification indicating that the reading order of the documents 32 is inappropriate to an outside when determining that the reading order of the documents 32 is inappropriate.

With this configuration, the user may recognize an inappropriate direction of documents set on the scanner 20, that is, an inappropriate reading order of the documents 32.

Moreover, according to this embodiment, the controller 11 sorts the document data of the plurality of pages before storing the document data, when determining that the reading order of the documents 32 is inappropriate.

With this configuration, the controller 11 may store the document data of the plurality of pages in page order corresponding to appropriate reading order by sorting the document data of the plurality of pages in reversed order relative to the order of obtained pages.

Furthermore, this embodiment discloses an image processing program 12 which causes a computer to execute a process for a result of the reading on the plurality of documents 32. Specifically, the image processing program 12 causes the CPU 11a to execute a function of obtaining document data of a plurality of pages generated by reading on the documents 32, a function of detecting a heading region corresponding to a headline of a document in the obtained document data of the individual pages, and a function of determining whether the order of the reading on the plurality of documents is appropriate by estimating the anteroposterior relationship based on presence or absence of the heading region in the document data of the individual pages. In addition, the method including the various processes executed by the image processing apparatus 10 may be revealed by this embodiment.

Note that this embodiment is applicable to a case where document data of a plurality of pages generated by the scanner 20 successively performing one-side reading on one of surfaces of the documents 32 on which text is printed on the one side is processed. Specifically, the determination as to whether the reading order of the documents 32 is appropriate may be made by performing detection of a heading region or the like and estimation of the anteroposterior relationship among pages on the document data of the plurality of pages generated by consecutively reading one surfaces of the plurality of documents 32 as described above.

What is claimed is:

1. An image processing apparatus comprising:
a controller configured to execute a process on a result of reading on a plurality of documents,
wherein the controller
obtains document data of a plurality of pages generated by reading the plurality of pages,
executes detection of a heading region corresponding to a headline of a document on the obtained document data of the individual pages, and
makes a determination as to whether reading order of the documents is appropriate by estimating the anteroposterior relationship among the pages based on presence or absence of the heading region in the document data of the individual pages,
wherein the controller executes detection of a blank region in a lower portion of a page on the document data of the individual pages and estimates the anteroposterior relationship of the pages based on presence or absence of the heading region and presence or absence of the blank region in the document data of the individual pages.

2. The image processing apparatus according to claim 1, wherein the controller detects the heading region based on a font size or line spaces of character strings included in the document data.

3. The image processing apparatus according to claim 1, wherein the controller transmits a notification indicating that reading order of the documents is inappropriate to an outside when determining that the reading order is inappropriate.

4. The image processing apparatus according to claim 1, wherein the controller sorts the document data of the plurality of pages before storing the document data when determining that reading order of the documents is inappropriate.

5. A non-transitory computer-readable recording medium storing an image processing program that causes a computer to execute a process on a result of reading on a plurality of documents, the program comprising:

obtaining document data of a plurality of pages generated by reading the plurality of pages;

detecting a heading region corresponding to a headline of a document on the obtained document data of the individual pages and detecting a blank region in a lower portion of a page on the document data of the individual pages; and making a determination as to whether reading order of the documents is appropriate by estimating the anteroposterior relationship among the pages based on presence or absence of the heading region in the document data of the individual pages and presence or absence of the blank region in the document data of the individual pages.

\* \* \* \* \*